United States Patent [19]

Parish et al.

[11] 3,972,451
[45] Aug. 3, 1976

[54] ADSORBER FILTER FILL SYSTEM CLOSURE APPARATUS

[75] Inventors: Harold Cheney Parish, Upper Arlington; Michael Duane Allard, Columbus; Jack Leland Pettit, Columbus; Ivars Sigurds Spulgis, Columbus, all of Ohio

[73] Assignee: CVI Corporation, Columbus, Ohio

[22] Filed: Sept. 17, 1975

[21] Appl. No.: 614,048

Related U.S. Application Data

[63] Continuation-in-part of Ser. No. 572,580, April 28, 1975.

[52] U.S. Cl. .............................. 222/485; 222/512; 222/561
[51] Int. Cl.² .......................................... B67D 3/00
[58] Field of Search ........... 222/482, 485, 512, 561, 222/484; 251/86

[56] References Cited
UNITED STATES PATENTS

| 1,799,061 | 3/1931 | Petty | 222/485 |
| 2,272,184 | 2/1942 | Carlson | 222/512 |

Primary Examiner—Allen N. Knowles
Assistant Examiner—Hadd Lane
Attorney, Agent, or Firm—Charles N. Quinn

[57] ABSTRACT

A closure apparatus is provided for optionally closing and opening a storage hopper portion of an adsorber filter fill system used for filling adsorber filter cells in a gas adsorber filter system. The closure apparatus is particularly adapted to have a portion thereof move with respect to a metering means of storage hopper of an adsorber filter fill system between first or open and second or closed positions, so as to optionally, selectably permit the opening and closing of the storage hopper. The closure apparatus provides a substantially air-tight seal at holes in the metering means of the adsorber filter fill system when the closure apparatus is at the closed position. The closure apparatus is designed so that its sliding operation and maintenance of substantially air-tight seals is not adversely affected by the presence of any granules of adsorbent which remain in the holes in the metering means or in the vicinity of the holes in the metering means once filling of the adsorber filter system is completed.

11 Claims, 8 Drawing Figures

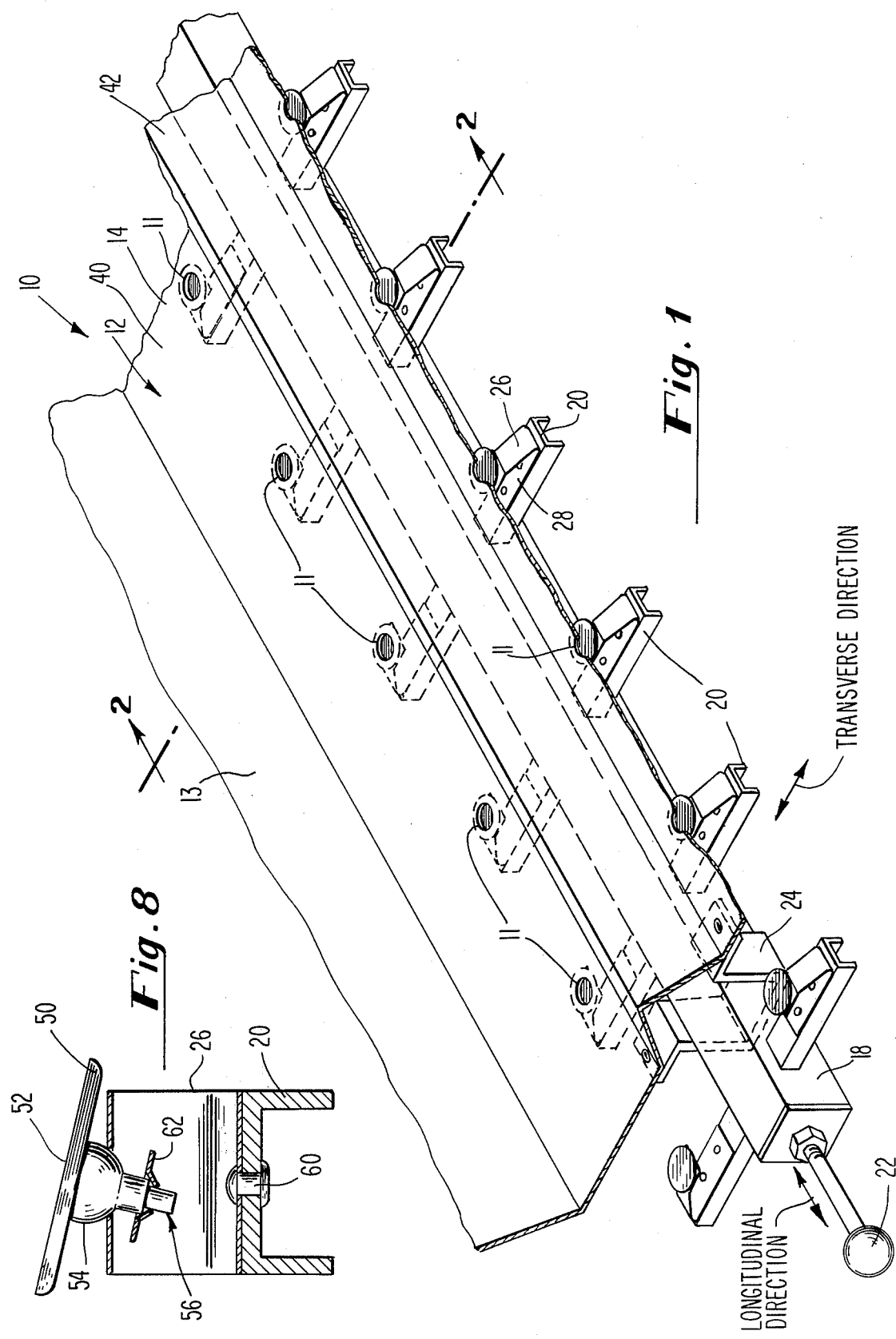

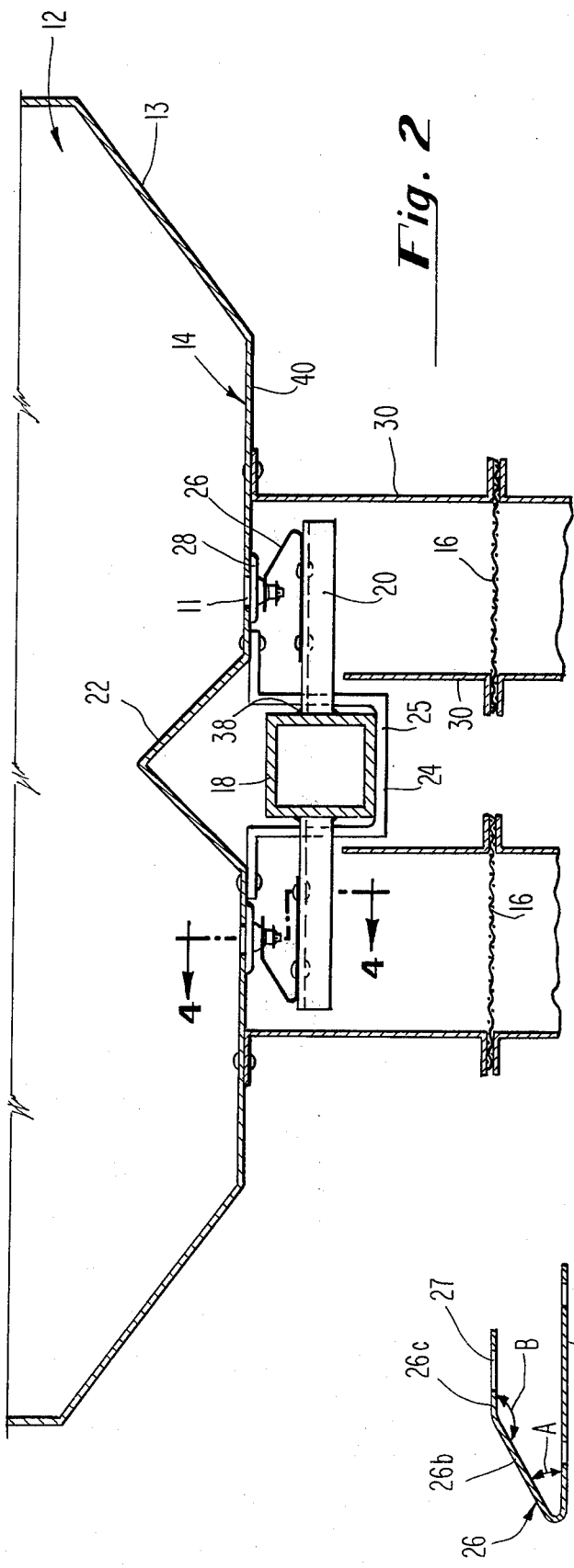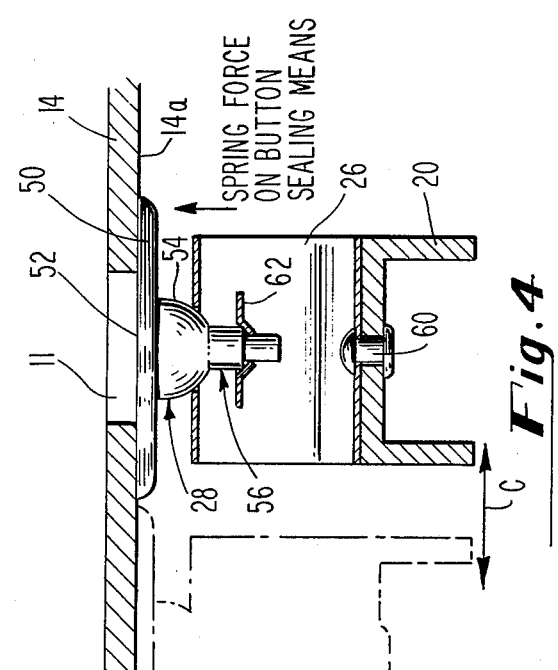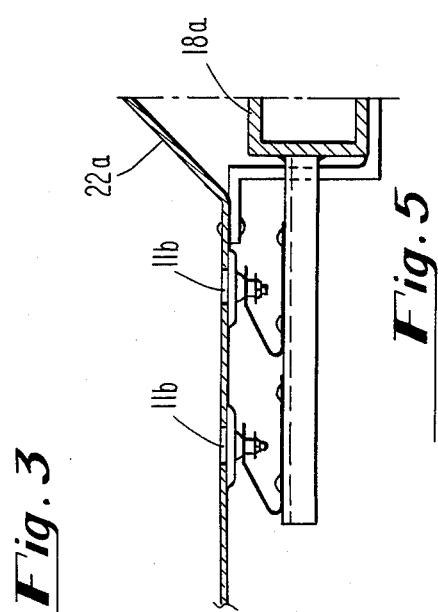

ADSORBER FILTER FILL SYSTEM CLOSURE APPARATUS

This application is a continuation-in-part of prior co-pending U.S. patent application Ser. No. 572,580, Charcoal Adsorber Filter Fill System, filed Apr. 28, 1975.

BACKGROUND OF THE INVENTION

Field of the Invention

This invention relates to adsorber filter fill systems and more particularly relates to an apparatus for optionally closing holes in the metering means of an adsorber filter fill system hopper in order to obtain a substantially air-tight seal at the holes. The apparatus of the present invention is designed to assure air-tight sealing of the holes in the metering means of the adsorber filter fill system when the apparatus of the present invention is in position so as to close the adsorber filter fill system, even if residual, unwanted adsorbent granules have remained in the holes in the metering means or are disposed between the sealing means of the closure apparatus and the metering means of the adsorber filter fill system.

The referenced prior parent patent application describes and shows adsorber filter fill apparatus, in a variety of embodiments, for filling adsorber filter cells with granular adsorbent. It also describes and claims a method for filling such a adsorber filter fill system. The method works most successfully when a substantially air-tight seal is affected at the holes in the metering means of the adsorber filter fill system. Several of the embodiments of the adsorber filter fill system described in the parent patent application have means for optionally opening and closing the holes in the metering means through which the granular charcoal passes as it flows downward into the adsorber filter cells. One of the characteristics of the various embodiments described in the parent application is that for a substantially air-tight seal to be created at the holes in the metering means when a gate means is at a first or closed position, machining of the metal parts is required, so that close fitting and tight tolerances may be maintained. This machining naturally increases the cost of manufacture of an adsorber filter fill system and unless high standards of quality control are maintained, a substantially air-tight seal is not obtained when a gate means is in the first, closed position with respect to the metering means.

It is therefore an object of this invention to provide a closure apparatus for use in conjunction with an adsorber filter fill system which provides a substantially air-tight seal at the holes in the metering means of the adsorber filter fill system, when the closure apparatus is in the first closed position thereby preventing the flow of granular adsorbent of a storage hopper portion of the adsorber filter fill system, which apparatus does not require extensive machining operations during manufacture in order to obtain a substantially air-tight seal.

Summary of the Invention

The present invention provides an optionally openable closure apparatus for affecting a substantially air-tight seal at holes in the metering means of an adsorber filter fill system, when the closure apparatus is in position with respect to the storage hopper portion of the adsorber filter fill system such that the holes in the metering means are closed; the closure apparatus being designed so that it can operate successfully even if granules of adsorbent remain in the holes in the metering means.

In accordance with the foregoing, it is a principal object of this invention to provide a closure apparatus to optionally close holes, through which granular adsorbent can flow, in a metering means of an adsorber filter fill system for filling adsorber cells with granular adsorbent, which closure apparatus in the closed position provides a substantially air-tight seal at the holes in the metering means.

It is a further object of the present invention to provide a closure apparatus to optionally close holes in a metering means of an adsorber filter fill system through which granular adsorbent can flow which eliminates the need for closely machined surfaces with close tolerances in order to affect air-tight seals at the holes in the metering means.

It is a further object of the present invention to provide a closure apparatus to optionally close holes in a metering means of the adsorber filler fill system wherein there is provided spring-loaded button sealing means for sealing the holes in the metering means when the closure apparatus is in the first, closed position.

It is a further object of the present invention to provide a closure apparatus to optionally close holes, in a metering means of an adsorber filter fill system, which provides spring loaded button sealing means such that a flat, planar portion of said button sealing means is always in contact with the metering means, in either the open or closed position of the closure apparatus, so that loose granular absorbent does not affect the operation of the apparatus.

It is a further object of the present invention to provide a closure apparatus to optionally close holes through which granular absorbent can flow in a metering means of an adsorber filter fill system for filling adsorber filter cells with granular adsorbent, which provides a ball-joint mounting for a button sealing means so that the seals at the holes in the metering means, when the closure apparatus is in the closed position, are not affected by any remaining adsorbent granules and each button sealing means for a single holes is individually swivelable, without regard to any remaining button sealing means of the closure apparatus.

It is a further object of the present invention to provide a closure apparatus to optionally close holes through which granular adsorbent can flow, in a metering means of an adsorber filter fill system for filling adsorber filter cells with granular adsorbent which is easily and economically manufactured.

These and other objects of the present invention will be apparent to those of ordinary skill in the art from an inspection of the attached drawing figures and from a reading of the following specification and the appended claims.

The present invention in the preferred embodiment solves the problems present in the prior art and solves in an even more optimal fashion some of the problems solved by the apparatus described in the co-pending, parent patent application described above, by providing one or more spring-loaded button sealing means of suitable size and shape for providing a substantially air-tight seal at the holes in the metering means of an adsorber filter fill system, when the closure apparatus of the present invention is in the closed position, where the closure apparatus and the spring-loaded button sealing means are easily adaptable to a variety of configurations of adsorber filter fill systems.

BRIEF DESCRIPTION OF THE DRAWINGS

FIG. 1 is a broken away isometric view of the charcoal adsorber filter fill system closure apparatus of the present invention showing the closure apparatus in a position whereby the charcoal adsorber filter fill system is closed and no granular adsorbent can flow downward out of the filter fill system.

FIG. 2 is a partial sectional view of a granular adsorber filter fill system with the closure apparatus of the present invention shown therein, taken along the lines and arrows 2—2 shown in FIG. 1. In FIG. 2, major portions of the adsorber filter fill system have been broken away so as to emphasize the closure apparatus of the present invention.

FIG. 3 is a side sectional view of a spring means portion of the closure apparatus of the present invention.

FIG. 4 is a sectional view, taken along the lines and arrows 4—4 in FIG. 2, of the cross member, spring and button sealing means forming a major part of the closure apparatus of the present invention with the button sealing means, spring means and cross member being shown in a solid, partially sectioned view, closing a hole in the metering means of the adsorber filter fill system and with the button sealing means, the spring means, and the cross member shown in phantom, at an alternate position, with the button sealing means in a position whereby a hole in the adsorber filter fill system is open thereby allowing granular adsorbent to flow out thereof.

FIG. 5 is a partial sectional view of the closure apparatus for a adsorber filter fill system of the present invention showing a second embodiment of the closure apparatus of the present invention for use in a larger absorber filter fill system having more holes for the discharge of granular adsorbent therefrom.

FIG. 8 is a sectional view of a spring means portion and a button sealing means portion of the present invention, taken from the same direction as FIG. 4, showing pivotable movement of the button sealing means portion of the present invention with respect to the spring means portion of the present invention.

In the drawings, identical numbers represent parts having identical or substantially similar functions in different embodiments of the present invention. Lower case alphabetic letters denote different embodiments of the present invention.

DESCRIPTION OF THE PREFERRED EMBODIMENTS

Figure 7:
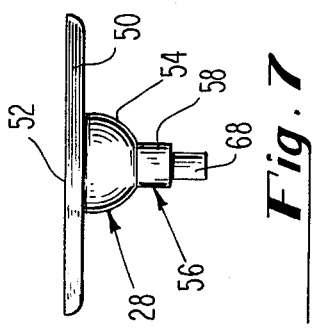
FIG. 7 is a side view of a button sealing means portion of the closure apparatus of the present invention.

Reference is now made to FIG. 1 which illustrates a preferred embodiment of the closure apparatus of the present invention for an adsorber hopper portion of an adsorber filter fill system wherein the adsorber filter fill system has been designated generally as 10 with a hopper portion designated as 12. The adsorber filter fill system has been substantially broken away so as to show more clearly the details of the closure apparatus of the present invention. The adsorber filter fill system has generally a side wall 13 of the hopper 12 and a metering means 14 which comprises the bottom portion of the hopper 12 of the adsorber filter fill system. The metering means 14 has a generally flat, plate-like configuration at one portion thereof, designated as 40 and an inverted "V" portion, designated generally as 42. The inverted V portion 42 along with the hopper side wall 13, both of which are inclined at angle to the flat, plate-like portion 40 of the metering means 14, encourage the flow of any granular absorbent in the hopper portion 12 to the flow downward, due to the force of gravity, to the plate like portion 40 of the metering means 14. The adsorber filter fill system designated as 10 with the metering means thereof designated as 14 which is a part of a hopper 12 is shown in more detail in co-pending U.S. patent application Ser. No. 572,580 Charcoal Adsorber Filter Fill System, the parent application of this continuation-in part application.

Also shown in FIG. 1 are arrows denoting the longitudinal direction and the transverse direction as per the labels shown. These directions will be referred to hereinafter and it is to be understood that the longitudinal direction is the direction in which the tongue 18 travels while the transverse direction is a direction perpendicular to the longitudinal direction, along the flat portion of the metering means 14.

Still referring to FIG. 1, the tongue 18 has disposed therefrom a plurality of cross members designated 20. These cross members are securedly affixed to the tongue 18 by any suitable means, such as by welding, and the cross members 20 move in the longitudinal direction as the tongue 18 is moved. A handle means 22 is provided for moving the tongue in the longitudinal direction. It is to be understood that the handle means in and of itself comprises no part of the present invention and in fact any suitable means, including various power means such as pneumatic power, electric motors and the like can be used to move the tongue in the longitudinal direction, depending upon the size and weight of the tongue and the associated structure which extends therefrom. The tongue is supported from below by a support means 24 which is secured to the metering means 14 and extends therefrom at least partially away from the metering means so that the tongue 18 can fit between the metering means 14 and support means 24. At least one support means is used and more may be used depending upon the size and weight of the tongue which is being supported. Typically the support means are secured to the metering means by any suitable means for material fastening, such means being dependent upon the weight of the tongue and associated structure which are being supported. In the embodiment shown in FIG. 1, each cross-member has secured thereto a spring means 26 and each spring has pivotally mounted thereon a button sealing means 28. In most embodiments of the closure apparatus of the present invention, the number of springs will be the same as the number of hole means 11 in the metering means 14 for which it is desired to provide closure and a button sealing means 28 will be provided for each hole 11 in the metering means 14, which it is desired to seal, with one button sealing means provided for each hole in the metering means and each button sealing means being pivotally mounted on a spring. The springs 26 are secured to cross members 20 using any suitable fastening means, such as rivets, epoxy cement and the like.

It will be understood that the tongue 18 moves in the longitudinal direction generally between two discrete positions. At a first position of said tongue with respect to the metering means, all of the holes 11 in the metering means 14 are open, with none of the button sealing means 28 overlaping any of the holes. Consequently any granular absorbent in the fill hopper of the adsorber filter fill system 10 can flow downward out of the storage hopper 12. At the second position of the tongue with respect to the metering means, each hole in the metering means is closed from below by one of the button sealing means and no granular adsorbent can flow downward out of the storage hopper of the adsorbent filter fill system. At the first and second discrete positions of the tongue with respect to the metering means and as the tongue moves between these two positions, the button sealing means 28 are maintained in sliding contact with the metering means 14 by an upward force exerted by the springs 26 on the button sealing means 28. Consequently, as the tongue slides back and forth, the button sealing means slide along the bottom surface of the metering means in constant contact therewith.

Reference is now made to FIG. 2 which is a sectional view of the closure apparatus of the present invention in position below a adsorber filter fill system, showing portions of the adsorber filter fill system, taken generally along the lines and arrows 2—2 in FIG. 1. Again visible in FIG. 2 is the storage hopper portion of the adsorber filter fill system designated generally as 12 having hopper side walls 13, an inverted V portion or ramp means 42, metering means 14 of which the ramp means 42 is a portion thereof, with hole means 11 in the metering means 14 and the metering means having a generally planner portion 40, all substantially as shown in FIG. 1. The top portion of the hopper storage means has been cut away since it forms no part of the present invention as claimed hereinafter and it need not be completely shown in order to understand the operation of the closure apparatus of the present invention. Also shown in FIG. 2 are side wall guide means 30 extending downward from the metering means 14 for guiding any granular adsorbent which falls through the hole means 11 into an adsorber filter system (which would be disposed generally below adsorber filter fill system shown in FIG. 2). As can be seen, some of the side wall guide means 30 extend upwards and are secured to the metering means 14 while other of the side wall guide means extend only partially upward and cannot structurally connect with the metering means 14 due to the presence of cross member 20 of the closure apparatus of the present invention. Also shown in FIG. 2 is a distribution means 16 of generally mesh or screen-like structure through which the granular material falls and which affects a substantially even distribution of the granular adsorbent as it exits from the adsorbent filter fill system into the adsorber filter itself. One or more distribution means 16 may be utilized, however, only a single distribution means 16 below each set of holes 11 in the metering means has been shown. The distribution means 16 and the side walls 30 form no part of the present invention and consequently are not shown in any greater detail since understanding of their function will suffice for understanding the present invention.

Also shown in FIG. 2 is the support means 24 which has a central portion 25 remote from the metering means 14 so that the tongue 18 can rest thereon, between the support means 24 and the metering means 14 as is seen in FIG. 2, wherein the tongue 18 is generally of a box-like configuration and has extending therefrom the cross members 20. Welds 38 are shown which secure the cross members 20 and the tongue 18. In this connection, it will be understood that the tongue 18 can be of any suitable shape and that the box like configuration is not necessary for the successful operation of the present invention; likewise the cross members 20 can be attached to the tongue 18 using any suitable means and it is not necessary that they be welded thereto.

Still referring to FIG. 2, it is seen that each cross member 20 has attached thereto springs 26 and each spring supports a button sealing means 28 having a planar portion thereof which is continually in sliding planar contact with the bottom surface 14a of the metering means. The button sealing means 28 is held against the metering means 14 by virtue of force exerted on the button sealing means, in the upward direction in FIG. 2, by the spring means 26.

In the configuration of the closure apparatus of the present invention shown in FIGS. 1 and 2, it will be noted that the cross members 20 are arranged in pairs, extending from the tongue 18 from either side thereof, in a substantially uniform fashion. It will be understood that the present invention could be constructed with cross members extending from a tongue from only a single side thereof and that any number of cross members could be utilized depending upon the size and shape of the particular storage hopper portion of adsorber filter fill system which was being provided with a closure apparatus. Similarly, as the tongue moves in a longitudinal direction between the two discrete positions, stop means may be provided to limit the travel of the tongue between the two positions. The stop means can take the form of the support means 24 being placed in sufficient proximity to the cross members 20 so that the longitudinal travel of the tongue 18 in either direction is limited by the support means 24 contacting the cross members.

Reference is now made to FIG. 3 which is a side sectional view of a spring means 26 of the present invention where the three portions of the spring means are shown and designated. The spring means shown in FIG. 3 has three distinct parts thereof, a first portion designated 26a which is suitably disposed for secure attachment to any associated cross member of the closure apparatus of the present invention, a second portion designated 26b which extends away from the first portion at a first angle which as been designated as angle "A" in FIG. 3 with said second portion being that portion which connects said first portion 26a with a third portion designated as 26c, where the third portion extends away from the second portion at an angle which has been designated as "B" in FIG. 3. The third portion 26c is suitably disposed for having a button sealing means pivotly mounted thereto. The spring can be securely attached to any associated cross member by any suitable means including rivets, epoxy and the like. As shown in FIG. 3, two holes are provided in the first portion for riveting the spring to the cross member, however, it is to be understood that the present invention is not limited to springs which are riveted to their associated cross members.

The third portion 26c of the spring has a hole 27 therethrough. This hole 27 is used for mounting the button sealing means thereto. In the spring 26 shown in FIG. 3, the angle A between the first portion 26a and second portion 26b is generally any acute angle while the angle B between the second portion 26b and the third portion 26c is generally an obtuse angle. These angles may be chosen, as shown in FIG. 3, so that the third portion 26c of the spring 26 is substantially parallel to the first portion 26a of the spring 26. This configuration results in the maintenance of the planar surface of the button sealing means substantially parallel to a bottom planar surface 14a of the metering means 14 and results in the sealing button means remaining in substantially constant coplanar contacting relation with the metering means 14. This is highly desirable since with this arrangement, any granules of adsorbent material which may be stuck in the hole 11 will not prevent an effective, substantially air-tight seal between the button sealing means and the metering means, when the button sealing means covers a corresponding hole in the metering means. The spring is preferably of the leaf-spring type, however any suitable spring can be used. Due to the configuration of the spring many materials are suitable for manufacture of the springs; one material which has been used with success is ordinary steel of a thin gauge.

Reference is now made to FIG. 7 which is a side elevation view of the button sealing means portion of the closure apparatus of the present invention. The button sealing means, designated generally as 28, in the preferred embodiment has a generally planar portion designated 50 with the planar portion having a first planar surface designated 52. The button sealing means has a hemispherical portion designated 54 which is disposed remote from the first planar surface 52 of the planar portion 50 and also has a shaft portion 56 which extends from the hemispherical portion away from and substantially perpendicular to the planar portion 50. The shaft portion shown in FIG. 7 has two generally cylindrical portions, a first large cylindrical portion 58 and a second smaller cylindrical portion 60. Both of these two cylindrical portions have a common axis of symmetry. That axis of symmetry in the preferred embodiment is coincidental with the axis of symmetry of the hemispherical portion 54 and the planar portion 50 as shown in FIG. 7. It is to be understood that the planar surface of the planar portion is of such a size so as that it has at least a circular area portion which is of a greater circular area than any of the holes 11 in the metering means. With this, when the planar surface 52 of the planar portion 50 of the button sealing means 28 is in coplanar, contacting relation with the metering means 14 and the tongue 18 has been moved to the position by holes 11 in the metering means 14 are covered, there is sufficient area at the planar surface 52 to substantially cover and overlap around the hole which the button sealing means is to cover and seal. In the preferred mode of operation, the cross members, springs and button sealing means will be disposed so that the geometric center of the planar surface 52 is substantially coincidental with the geometric center of the hole which the button sealing means is to seal when the tongue is in the second position with respect to the metering means and the holes are closed. This overlap surface provides, in conjunction with the spring force exerted on the button sealing means, a substantially air-tight seal at the juncture of the hole 11 and the planar surface 52 so long as the button surface 14a of the metering means 14 in the immediate vicinity of the hole 11 is reasonably flat. This maintenance of a substantially air-tight seal when the closure apparatus of the present invention is in the closed position is an important feature of the present invention. Such maintenance of substantially air-tight seals allows the storage hopper of the adsorber filter fill system to be filled pneumatically using the method claimed in the parent patent application U.S. Ser. No. 572,580.

The button sealing means can be made of any suitable material. One material which has been used with success is polypropylene.

Reference is now made to FIG. 4 which is a partial sectional view of a cross member, spring, button sealing means, a portion of the metering means and a means for pivotly securing the button sealing means to the spring means, taken along the lines and arrows designated by the numbers 4—4 in FIG. 2.

In FIG. 4 the cross member, spring and button sealing means are shown in solid and section lines, taken along the section denoted by the lines and arrows 4—4 in FIG. 2 with the button sealing means in the position whereby the hole means is closed. The assembly of the button sealing means, spring and cross member is shown in phantom lines, in the left hand portion of FIG. 4, to denote the position of the button sealing means, spring and cross member asembly when these elements are in the position whereby the hole means in the metering means is open thereby allowing granular adsorbent to flow out of the storage hopper. In FIG. 4, the arrow C denotes the direction the button sealing means-spring-cross member assembly moves as the tongue moves between its first and second positions with respect to the metering means.

Also visible in FIG. 4 is a rivet 60 which secures the spring to the cross member where the rivet comprises means for securing a spring to its associated cross member. Additionally, there is shown a means for pivotably securing the button sealing means to the spring associated with the button sealing means, where the means for securing the button means has been designated as 62. Preferably, this means for securing the button sealing means to the spring is of the push-on type and is suitably sized with an internal hole therethrough for an interference fit with at least a portion of the shaft means which extends from the hemispherical portion of the button means. In FIG. 4, the means for securing the button means to the spring means is shown in an interference fit with the larger portion 58 of the shaft means 56.

It is to be understood that the spring means exerts a force in the vertical direction which tends to push the button sealing means against the lower surface 14a of the metering means 14. This spring force tends to maintain the planar surface 52 of the planar portion of the button sealing means 28 as designated in FIG. 7 in coplanar contacting relation with the lower surface 14a of the metering means. This coplanar contacting relation is maintained as the tongue and hence the button sealing means move between the first and second positions where the holes in the metering means are open and closed. Also, the button sealing means 28 tends to maintain its planar surface portion 52 in contact with the lower surface 14a of the metering means when the button sealing means 28 is at either the first position or the second position. This feature is particularly important when the tongue is at the second position, where the hole means are closed, so that a substantially airtight seal is maintained between the button sealing means and the metering means. This maintenance of the substantially air-tight seal acts to allow pneumatic filling of the fill hopper portion of the adsorber filter fill system with granular adsorbent.

Another feature of the construction of the present invention in the preferred embodiment as shown in FIG. 4 is the hole 27 in the spring means, shown in FIG. 3, is of a diameter less than the diameter of the hemispherical portion of the button sealing means 54, shown in FIG. 7. This means that the button sealing means can pivotally move while remaining in contact with the spring means as the spring means exerts an upward force on the button sealing means. Consequently any irregularities in the bottom surface 14a of the metering means or any granules of adsorbent materials which become lodged between the button sealing means and the bottom surface of the metering means 14a or in the hole means 11 do not affect, to any substantial degree, the sliding movement of the button sealing means with respect to the metering means. This is illustrated in FIG. 8 where the button sealing means 28 is shown as having pivoted with respect to the spring means 26 while remaining in contact with the spring means. A major advantage of this provision for pivotable movement of the button sealing means 28 with respect to the spring 26 is that the requirement for finely machined surfaces is eliminated. Some irregularity in surface 14a of the metering means 14 can be tolerated while still maintaining a substantially air-tight seal of the button sealing means against the bottom surface of the metering means. Furthermore, when the button sealing means have been made injection or compression molded plastic material, the hemispherical portion need not machined to tolerances and the parts may be used as they come directly from the mold. Accordingly, with the arrangement of the present invention in the preferred embodiment the costs for achieving the desired result have been substantially minimized.

Reference is now made to FIG. 5 where a second embodiment of the present invention is shown where two rows of hole means 11b are on a single side of the ramp means 22a which is a portion of the metering means. Also in this embodiment, two spring means and two button sealing means are mounted on each cross member on either side of the tongue means 18a. Other than the additional button sealing means and spring means present in the embodiment shown in FIG. 5, this embodiment is substantially the same as the embodiment shown in FIGS. 1 through 4 and FIGS. 7 and 8.

Figure 6:
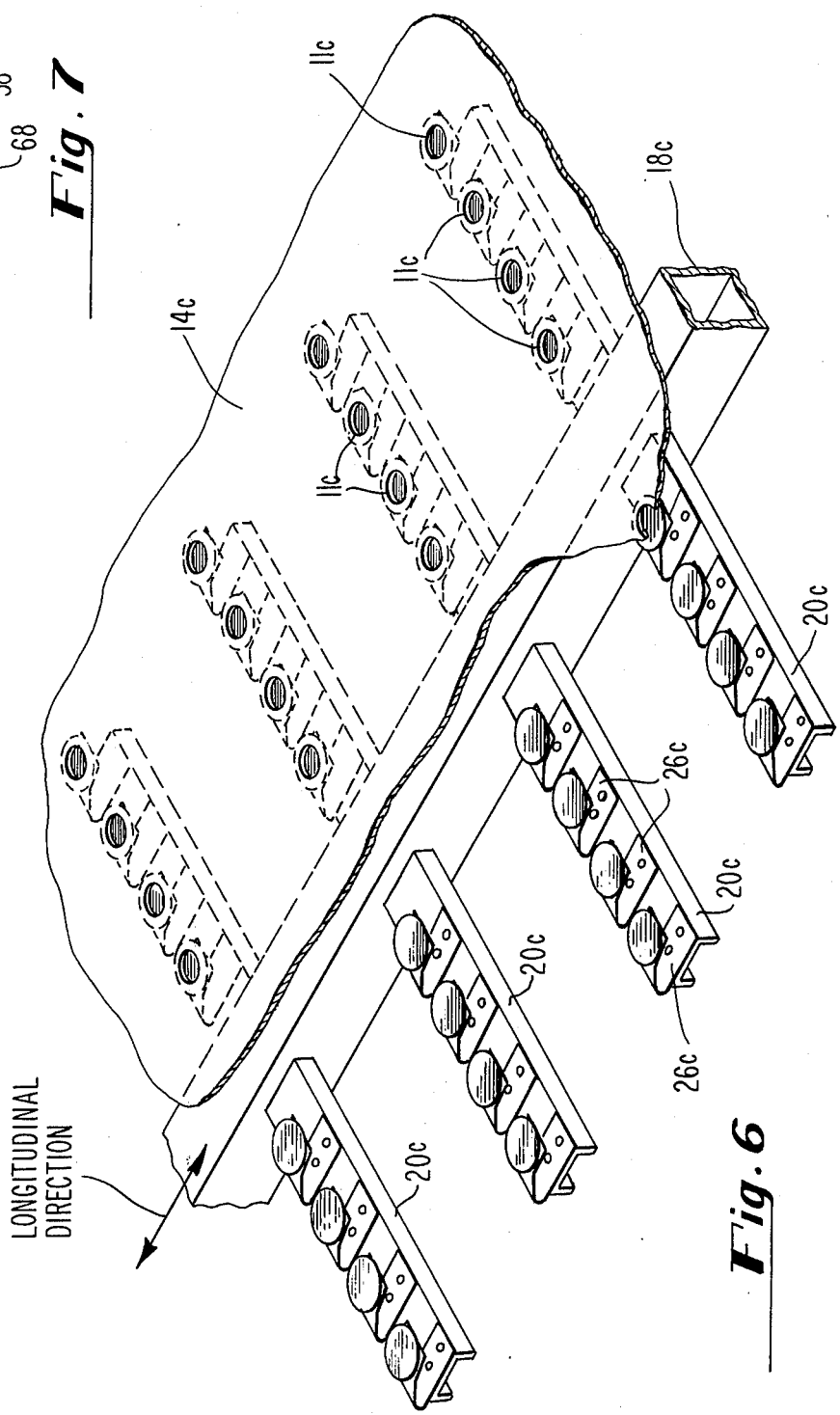
FIG. 6 is a partial, broken perspective view of the closure apparatus of the present invention showing yet another embodiment of the present invention wherein the closure apparatus of the present invention is used with an adsorber filter fill system for filling a large adsorber filter system.

FIG. 6 is a partial broken isometric view of yet another embodiment of the apparatus for optionally and closing the adsorbent storage hopper of the adsorbent filter fill system of the present invention. In the embodiment shown in FIG. 6, the direction of longitudinal movement of the tongue means 18c is again shown. In the embodiment shown in FIG. 6, the metering means 14c does not have a ramp means portion shown therein and the support means for vertically supporting the tongue 18b from below has been omitted for purposes of clarity. In the embodiment shown in FIG. 6, the metering means has four rows of holes 11c on either side of the tongue means 18c and consequently the adsorber filter fill system of which the apparatus shown in FIG. 6 could be used to fill a larger adsorber filter system having much wider adsorber filter beds therein.

It will be noted that the spring means 26c shown in FIG. 6 has been mounted in a direction whereby they have been rotated 90° with respect to the cross members 20c as compared to the embodiments shown in FIGS. 1, 2, 4 and 5. It is to be understood that the springs can be mounted in any orientation with respect to the cross members and that mixed orientations can be used in the same embodiment. The only requirement is that the springs be oriented with respect to the cross members such that the button sealing means are centered over the hole means in the metering means, when the tongue is at the second position, thereby closing the hole means in the metering means and that the button sealing means and the cross members be of a size such that when the tongue is at the first position with respect to the metering means, thereby opening the holes in the metering means, no granular adsorbent impinges on the button sealing means, the springs or the cross-members as it flows downward out of the storage hopper. Accordingly, it is apparent that the present invention can be constructed in a variety of configurations using a wide range of numbers and sizes of cross members, sizes of button sealing means, configurations of springs and the like so as to fit many, many different sizes and designs of metering means forming the bottom portion of hopper storage means for adsorber filter fill systems. Indeed, it is to be further understood that the embodiments shown in the accompanying specifications are only illustrative of the various embodiments in which the present invention can be constructed and are in no way to be construed to be limiting upon the configurations in which the present invention can be constructed.

What is claimed is:

1. Apparatus for optionally opening and closing the adsorbent storage hopper portion of an adsorber filter fill system, thereby selectably permitting or preventing any granular adsorbent in the storage hopper portion of the adsorber filter fill system to flow downward out of the adsorber filter fill system, comprising:

a. metering means having a portion thereof which is of a generally flat, plate-like configuration, said metering means forming a bottom portion of a storage hopper of said adsorber filter fill system, said metering means having at least two holes through said flat portion thereof for regulating a downward flow of granular adsorbent, due to gravitational forces, out of said storage hopper, said holes being substantially symetrically distributed over said flat portion of said metering means;
 b. a tongue located below said metering means and being disposed for longitudinal movement between two positions with respect to said metering means;
 c. at least one support means for vertically supporting said tongue, said support means being secured to said metering means and having a shape whereby at least a portion of said support means is disposed sufficiently remote from said metering means so as to allow said tongue to reside between said portion of said support means and said metering means;
 d. at least one cross member secured to said tongue, and extending transversely therefrom for movement therewith;
 e. at least two springs, at least one secured to each said cross member, the total number of said springs being the same as the number of said holes in said metering means, each said spring being means for maintaining a button sealing means in contact with said metering means;

f. means for securing each said spring to an associated cross member;

g. button sealing means pivotally mounted on each said spring, the number of said button sealing means being the same as the number of said holes in said metering means;

h. means for pivotally attaching each said button sealing means to said spring associated with said button sealing means; wherein when said tongue is at a first position with respect to said metering means, all of said holes in said metering means are open and granular adsorbent in the adsorber filter fill system can flow downward out of the storage hopper portion of said system but when said tongue is at a second position with respect to said metering means, each hole in said metering means is closed from below by one of said button sealing means and no granular adsorbent canflow downward out of the storage hopper portion of said system, said button sealing means being maintained in sliding contact with said metering means when said tongue is at said first position with respect to said metering means, when said tongue is at said second position with respect to said metering means and as said tongue moves with respect to said metering means between first and second positions, due to force exerted on said button sealing means by an associated spring.

2. Apparatus for optionally opening and closing the adsorbent storage hopper portion of an adsorber filter fill system thereby selectably permitting or preventing any granular adsorbent in the storage hopper portion of the adsorber filter fill system to flow downward out of the adsorber filter fill system, comprising:

a. metering means having a portion thereof which is of a generally flat, plate-like configuration, said metering means forming a bottom portion of a storage hopper of said adsorber filter fill system, said metering means having at least two holes through said flat portion thereof for regulating a downward flow of granular adsorbent, due to gravitational forces, out of said storage hopper, said holes being substantially symmetrically distributed over said flat portion of said metering means;

b. a tongue located below said metering means and being disposed for longitudinal movement between two positions with respect to said metering means;

c. at least one support means for vertically supporting said tongue, said support means being secured to said metering means and having a shape whereby at least a portion of said support means is disposed sufficiently remote from said metering means so as to allow said tongue to reside between said portion of said support means and said metering means;

d. at least one cross member secured to said tongue and extending transversely therefrom for movement therewith;

e. at least two springs, at least one secured to each said cross member, the total number of said springs being the same as the number of said holes in said metering means, each said spring being means for maintaining a button sealing means in contact with said metering means and further comprising:

i. a first portion suitably disposed for secure attachment to an associated cross member;

ii. a second portion extending away from said first portion at an angle and connecting said first portion with a third portion of said springs;

iii. a third portion extending away from said second portion at a second angle and being disposed remote from said first portion, said third portion being suitably disposed for having a button sealing means pivotaly mounted thereto;

f. means for securing each spring to an associated cross member;

g. button sealing means pivotally mounted on each said spring, the number of said button sealing means being the same as the number of said holes in said metering means;

h. means for pivotally attaching each said button sealing means to said spring associated with said button sealing means;

wherein when said tongue is at a first position with respect to said metering means, all of said holes in said metering means are open and granular adsorbent in the adsorber filter fill system can flow downward out of the storage hopper portion of said system but when said tongue is at a second position with respect to said metering means, each hole in said metering means is closed from below by one of said button sealing means and no granular adsorbent can flow downward out of the storage hopper portion of said system, said button sealing means being maintained in sliding contact with said metering means when said tongue is at said first position with respect to said metering means, when said tongue is at said second position with respect to said metering means and as said tongue moves with respect to said metering means between said first and second positions, due to force exerted on said button sealing means by an associated spring.

3. The apparatus for optionally opening and closing the storage hopper portion of an adsorber filter fill system, of claim 2, wherein said first angle is an acute angle and said second angle is an obtuse angle.

4. The apparatus for optionally opening and closing the adsorbent storage hopper portion of an adsorber filter fill system, of claim 3, wherein said first and second angles are such that said first portion of said spring and said third portion of said spring are substantially parallel.

5. The apparatus for optionally opening and closing the adsorbent storage hopper portion of an adsorber filter fill system, of claim 2, wherein each said button sealing means further comprises:

a. a planar portion having a first planar surface, said planar surface having at least a circular area portion greater than the area of any one of said holes in said metering means whereby when said planar portion of one said button sealing means is in coplanar, contacting relation with said metering means and said planar surface covers said hole in substantially symmetric relation therewith, said circular area portion of said planar surface substantially overlaps said hole around the entire periphery thereof;

b. a hemispherical portion disposed remote from said first planar surface of said planar portion;

c. a shaft portion disposed remote from said planar portion and extending from said hemispherical portion at a direction substantially perpendicular to said planar surface of said planar portion.

6. The apparatus for optionally opening and closing the adsorbent storage hopper portion of an adsorber filter fill system, of claim 5, wherein each said spring has a hole formed at said third portion thereof, said hole being round and having a radius less than the radius of said hemispherical portion of said button sealing means but greater than the maximum radius of said shaft portion of said button sealing means, whereby a button sealing means can pivot about said spring means with said hemispherical portion of said third portion of said spring as said planar portion of said button sealing means is maintained in coplanar contacting relation with said metering means due to force exerted on said button sealing means by said associated spring.

7. The apparatus for optionally opening and closing the adsorbent storage hopper portion of an adsorber filter fill system, of claim 6, wherein an axis of symmetry of said hemispherical portion of said button sealing means, if drawn, would be perpendicular to said planar portion of said button sealing means.

8. The apparatus for optionally opening and closing the adsorbent storage hopper portion of an adsorber filter fill system, of claim 7, wherein said shaft portion of said button sealing means has a first, larger diameter cylindrical portion extending from said hemispherical portion and a second, smaller diameter cylindrical portion extending from said first, larger diameter cylindrical portion and having a common axis of rotation therewith, and wherein said means for pivotally securing each said button sealing means to said spring further comprise fasteners of a push-on type, of suitable size for an interference fit with said shaft portion of said button sealing means.

9. The apparatus for optionally opening and closing the adsorbent storage hopper portion of an adsorber filter fill system, of claim 8, wherein said springs are of the leaf spring type.

10. Apparatus for optionally opening and closing the adsorbent storage hopper portion of an adsorber filter fill system, thereby selectably permitting or preventing any granular adsorbent in the storage hopper portion of the adsorber filter fill system to flow downward out of the adsorber filter fill system, comprising:
   a. metering means having a portion thereof which is of a generally flat, plate-like configuration, said metering means forming a bottom portion of a storage hopper of said adsorber filter fill system, said metering means having a hole through said flat portion thereof for regulating a downward flow of granular adsorbent, due to gravitational forces, out of said storage hopper;
   b. a tongue located below said metering means and being disposed for longitudinal movement between two positions with respect to said metering means;
   c. at least one support means for vertically supporting said tongue, said support means being secured to said metering means and having a shape whereby at least a portion of said support means is disposed sufficiently remote from said metering means so as to allow said tongue to reside between said portion of said support means and said metering means;
   d. a cross member secured to said tongue, and extending transversely therefrom for movement therewith;
   e. a spring secured to said cross member, for maintaining sealing means in contact with said metering means;
   f. means for securing said spring to said cross member;
   g. sealing means pivotally mounted on said spring;
   h. means for pivotally attaching sealing means to said spring;

wherein when said tongue is at a first position with respect to said metering means, said hole in said metering means is open and granular adsorbent in the adsorber filter fill system can flow downward out of the storage hopper portion of said system but when said tongue is at a second position with respect to said metering means, said hole in said metering means is closed from below by said sealing means and no granular adsorbent can flow downward out of the storage hopper portion of said system, said sealing means being maintained in sliding contact with said metering means when said tongue is at said first position with respect to said metering means when said tongue is at said second position with respect to said metering means and as said tongue moves with respect to said metering means between said first and second positions, due to force exerted on said sealing means by said spring.

11. The apparatus for optionally opening and closing the adsorbent storage hopper portion of an adsorber filter fill system, of claim 10, wherein said spring further comprises:
   a. a first portion suitably disposed for secure attachment to said cross member;
   b. a second portion extending away from said first portion at first angle and connecting said first portion with a third portion of said spring;
   c. a third portion extending away from said second portion at a second angle and being disposed remote from said first portion, said third portion suitably disposed for having said sealing means mounted thereto.

* * * * *

UNITED STATES PATENT OFFICE
CERTIFICATE OF CORRECTION

Patent No. 3,972,451     Dated August 3, 1976

Inventor(s) Harold Cheney Parish, Michael Duane Allard, Jack Leland Pettit, Ivars Sigurds Spulgis It is certified that error appears in the above-identified patent and that said Letters Patent are hereby corrected as shown below:

In column 13, line 8, after "hemispherical portion of said" add --button sealing means moving within said hole in said--.

Signed and Sealed this

Twenty-sixth Day of October 1976

[SEAL]

Attest:

RUTH C. MASON
Attesting Officer

C. MARSHALL DANN
Commissioner of Patents and Trademarks